INVENTORS.
JOHN A. BOLLMAN
AUSTIN A. GATES
HAROLD C. VOSS
BY Van Valkenburgh and Fields
ATTORNEYS Oct. 10, 1967     J. A. BOLLMAN ET AL     3,346,439
STAMP AFFIXING MACHINE
Filed Nov. 4, 1963     10 Sheets-Sheet 3

INVENTORS.
JOHN A. BOLLMAN
BY AUSTIN A. GATES
HAROLD C. VOSS
Van Valkenburgh and Fields
ATTORNEYS

INVENTORS.
JOHN A. BOLLMAN
AUSTIN A. GATES
BY HAROLD C. VOSS

Van Valkenburgh and Fields

ATTORNEYS

Oct. 10, 1967    J. A. BOLLMAN ET AL    3,346,439
STAMP AFFIXING MACHINE
Filed Nov. 4, 1963    10 Sheets-Sheet 5

INVENTORS
JOHN A. BOLLMAN
AUSTIN A. GATES
BY HAROLD C. VOSS.
Van Valkenburgh and Fields
ATTORNEYS INVENTORS.
JOHN A. BOLLMAN
AUSTIN A. GATES
HAROLD C. VOSS
BY Van Valkenburgh and Fields
ATTORNEYS

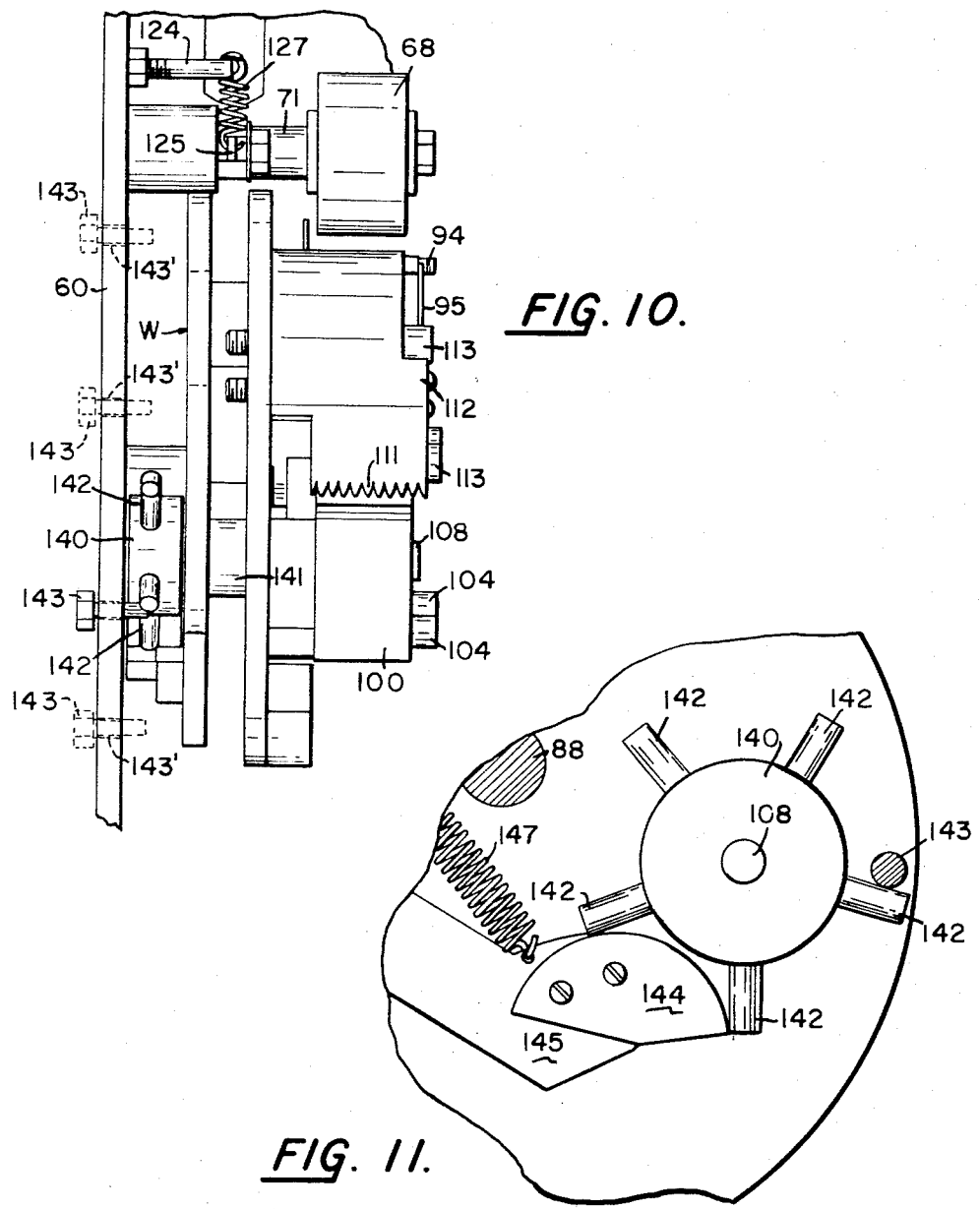

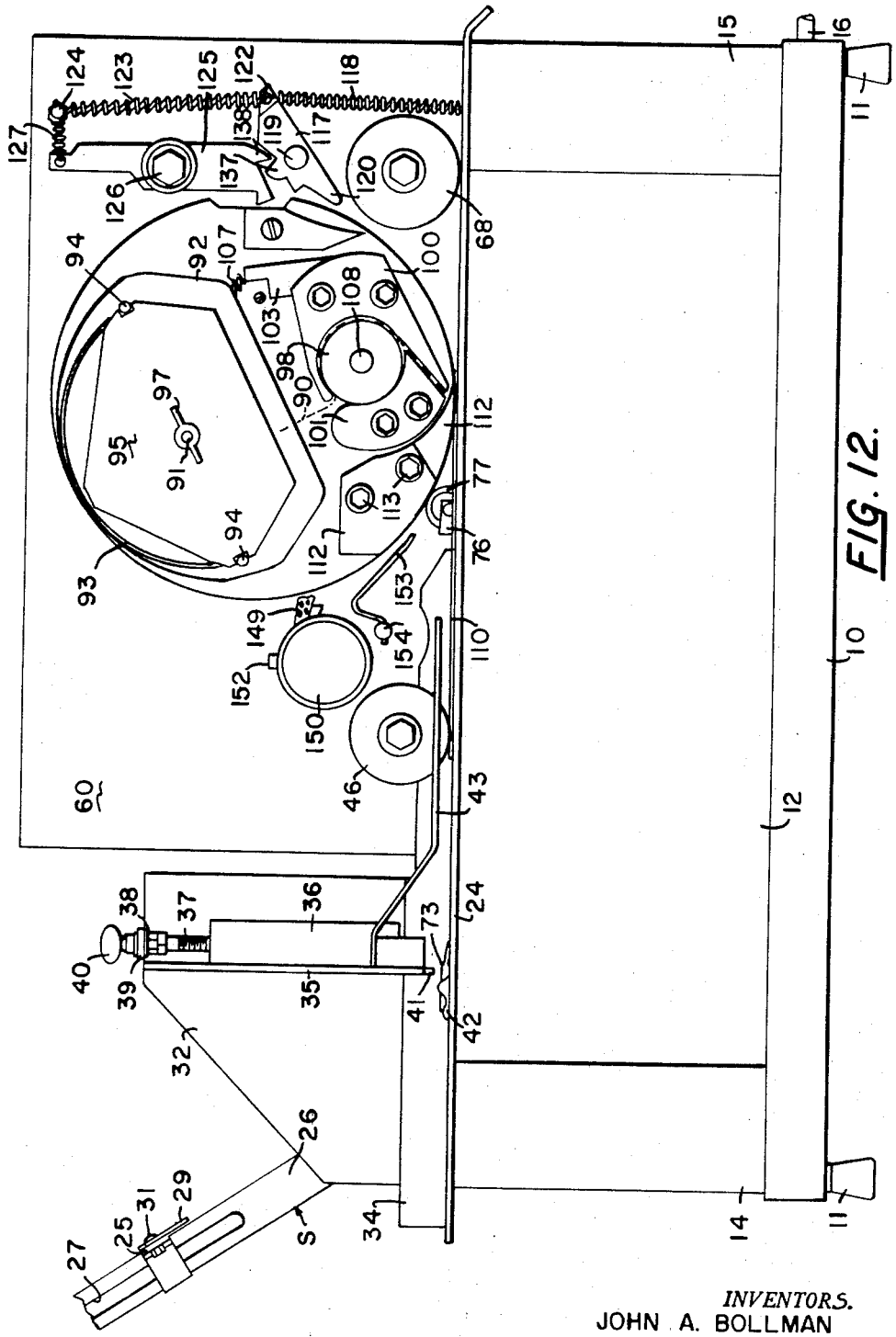

INVENTORS.
JOHN A. BOLLMAN
BY AUSTIN A. GATES
HAROLD C. VOSS
Van Valkenburgh and Fields
ATTORNEYS United States Patent Office 3,346,439
Patented Oct. 10, 1967

3,346,439
STAMP AFFIXING MACHINE
John A. Bollman and Austin A. Gates, Denver, and Harold C. Voss, Westminster, Colo., assignors of one-fourth to said John A. Bollman, one-fourth to Max H. Rechnitz, and two-fourths to Romeo J. Martin, all of Denver, Colo.
Filed Nov. 4, 1963, Ser. No. 321,108
13 Claims. (Cl. 156—522)

ABSTRACT OF THE DISCLOSURE

A machine for dispensing and affixing stamps as to envelopes, including a device for feeding one envelope at a time beneath a stamp affixing wheel, which is rotated intermittently, in accordance with the position of the envelope. A roll of stamps is placed inside the stamp wheel and is threaded around a spindle having pins for engaging the perforations of the stamps, the spindle engaging the non-adhesive surface and feeding the stamps to a slot, which is tangential to the spindle. The slot extends angularly to the periphery of the wheel and the stamps are fed out of the slot in a direction opposite the rotation of the wheel. A moistening device is mounted adjacent the wheel and a knife or other cutoff device is mounted in the wheel, being actuated by a cam or lever when the wheel comes to a point at which the stamp wheel is pressing the stamp or stamps against the envelope. An indexing device turns the spindle and a series of stops may be placed at selected positions to turn the indexing device, so that one, two, three, etc., stamps will be fed at each rotation of the stamp wheel.

This invention relates to a strip affixing machine, and more particularly to a machine for affixing one or more postage stamps to envelopes.

Previous attempts have been made to provide a machine for dispensing and affixing postage stamps to envelopes. However, each of these machines had certain inherent disadvantages. One such machine dispenses a metered stamp with a predetermined amount of postage printed on it. The amount of each stamp is preset by the operator. This machine is preset at the post office to dispense a given number of dollars worth of stamps. After that amount of postage has been used, the operator must take the machine back to the post office to be reset. Such a procedure requires frequent trips to the post office and is quite time consuming. In addition, the machine may require resetting at a time which is highly inconvenient for the operator. Another type of machine, which dispenses conventional postage stamps, requires that a roll of stamps be rewound prior to being placed in the machine in order that the stamp will be dispensed in an upright position on the envelope. This machine is further limited in that it will place only one stamp on an envelope at a time. Other machines wet the stamps before they are dispensed, which soon results in the mechanism becoming gummed up, so that the machine will not operate properly until it is cleaned. This cleaning requires dismantling the machine, which is time consuming and costly and may be necessary at a very inconvenient time, such as during a period of the day when there is a substantial amount of mail to be stamped.

Among the objects of this invention are to provide a novel stamp affixing machine; to provide such a stamp affixing machine which will feed the envelopes, one at a time, and affix one or more stamps thereto; to provide such a stamp affixing machine which will dispense stamps from a roll without the necessity of rewinding the roll before placing it in the machine; to provide such a stamp affixing machine which places the stamps on the envelope right side up; to provide such a stamp affixing machine which feeds the stamp in the opposite direction to that in which the envelope is moving; to provide such a stamp affixing machine having means to prevent the stamps from curling as they are dispensed; to provide such a stamp affixing machine in which the stamps are moistened after being dispensed; to provide such a stamp affixing machine having means to prevent the feeding of two envelopes at the same time; to provide such a stamp affixing machine which will prevent stamps from being dispensed after the supply of envelopes has been exhausted; to provide such a stamp affixing machine which may be selectively indexed to dispense one or a plurality of stamps to be affixed to each envelope; to provide such a stamp affixing machine which may be adapted to affix an address label to an envelope or carton; and to provide a stamp affixing machine which may be adapted to affix sealing tape to cartons.

Additional objects and the novel features of this invention will become apparent from the description which follows, taken in conjunction with the accompanying drawings, in which:

FIG. 10 is an enlarged, fragmentary top plan view of the stamp feed wheel, showing the indexing wheel engaging an indexing pin;

FIG. 11 is an enlarged, fragmentary rear elevation of a portion of the stamp feed wheel, showing the indexing wheel and certain associated parts;

FIG. 12 is a side elevation, similar to FIG. 1, but on a larger scale and showing the stamp feed wheel in stamp affixing position;

In accordance with this invention, a stamp affixing machine includes a housing H for the motor and drive mechanism, described later, housing H including a base 10, as in FIG. 1, which is flat but provided with a downwardly extending flange at each edge, as in FIGS. 3 and 9, and thus conveniently made of sheet metal. Housing H is supported by feet 11, made of rubber, plastic or other suitable material, and may be adjustable, if desired, so that the machine may be leveled on an uneven surface. Housing H has side walls 12 and 13, and end walls 14 and 15 attached to base 10, as in FIGS. 1, 3 and 9, with end walls 14 and 15 having inturned side edges, as in FIG. 1, which overlap the ends of side walls 12 and 13.

Figure 1:
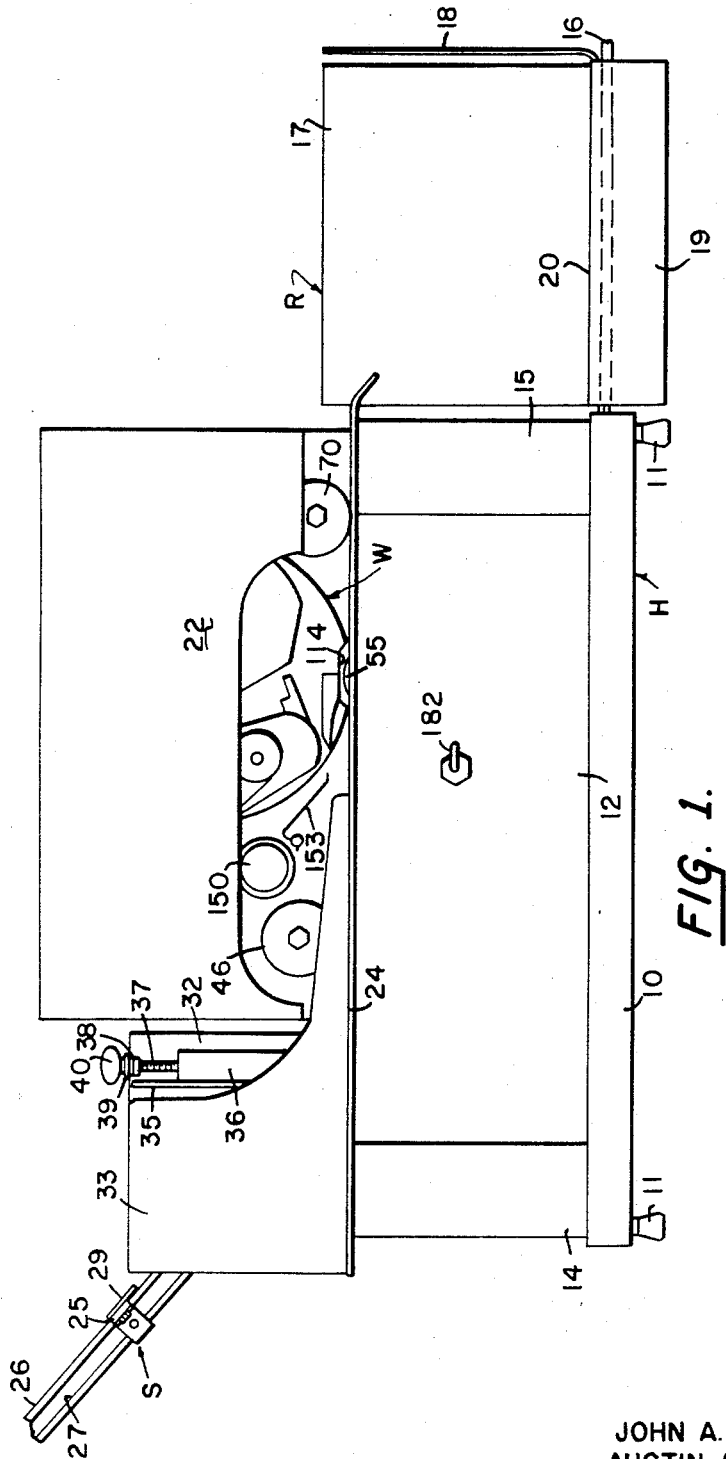
FIG. 1 is a side elevation, on a reduced scale, of a stamp affixing machine constructed in accordance with this invention, with a stamp feed wheel in neutral position.

The machine also includes an envelope hopper or stacker S, at the left end of the machine, as viewed in FIG. 1, from which the envelopes are fed past a stamp dispensing and affixing wheel W, which places one or more stamps on each envelope, the stamped envelope being deposited in a receptacle R. The receptacle R is supported by a pair of spaced rods 16 which extend from base 10 and has one open side, thus having a side wall 17, a back wall 18 and a depending side flange 19, each of which is integral with bottom 20. Conveniently, receptacle R may be made of sheet metal and is provided with at least one bracket 21, as in FIG. 2, which hooks over rod 16. Thus, the receptacle may be removed when it is full and replaced with another receptacle, or the envelopes may easily be lifted out of the receptacle from the open side. A generally rectangular cover 22 extends over the stamp wheel W and, as in FIG. 2, is attached by a piano type hinge 23 to a plate top 24 of housing H, to permit access to the stamp wheel for service and/or repair and also for the installation of a new roll of stamps.

The envelopes may be placed endwise in the stacker S, preferably prior to stuffing, so that they are supported in an angular position by a laterally extending support 25, with their lower edges resting on top plate 24. Support 25 is mounted on an angular bracket 26 and may be adjusted along a longitudinal slot 27 thereof by a thumb nut 28 of FIG. 2 to accommodate envelopes of different lengths, while bracket 26 may be adjusted to different angular positions, by a thumb nut 28', to accommodate different lengths and weights of envelopes, such as to the positions of FIGS. 1 and 3, as well as other positions. A block 29 is adjustable along a longitudinal slot 30 in support 25 and held in place by a bolt 31, preferably so that its distance from bracket 26 is about two-thirds the width of the envelopes being dispensed, so that the envelopes will be tilted slightly for a purpose to be described. Bracket 26 is attached, as by a pivot controlled by thumb nut 28', to a plate 32 which forms one side of the stacker, while a plate 33, conveniently having a lower front extension, as shown, forms the other side of the stacker. Plates 32 and 33 are attached to top plate 24, as by spot welding along a lower angular flange of plate 33 and a similar flange of plate 32. An angle 34 may be mounted in longitudinal position on top plate 24, to provide a guide for one edge of the envelopes. A front or stop plate 35 extends between plates 32 and 33 and is attached to an upright block 36 from the upper end of which a threaded post 37 extends through lock nuts 38 engaging the underside and top, respectively, of the horizontal leg of an angle 39 attached, as by welding, to plate 32. Post 37 threadedly engages block 36 and is provided at its upper end with a thumb piece 40 so that plate 35 can be adjusted upwardly or downwardly more readily. Also, a central projection or downwardly extending ear 41 is provided at the bottom of plate 35, for "cupping" or bending the lowermost envelope longitudinally, so that it will separate from the other envelopes and be frictionally engaged by laterally spaced cog wheels 42 and fed thereby to the stamp affixing wheel W, but the remaining envelopes will be prevented from being fed through cog wheels 42 by projection 41. As an envelope is fed from stacker S, it is held against top 24 by a resilient, angular finger 43 which is attached at one end to a block 44 mounted on front plate 35. Finger 43 extends downwardly and then forwardly to a point past a feed roller 45 and idler roller 46, having a longitudinal slot 47 therein, as in FIG. 2, through which a microswitch lever 48 of microswitch 49 extends to activate the stamp affixing wheel W, as described below. Thus, finger 43 guides each envelope in turn between rollers 45 and 46 so that microswitch lever 48 is tripped. Both roller 45 and roller 46 are rubber or rubber faced to assure a positive, non-slipping engagement with the envelopes.

Figure 2:
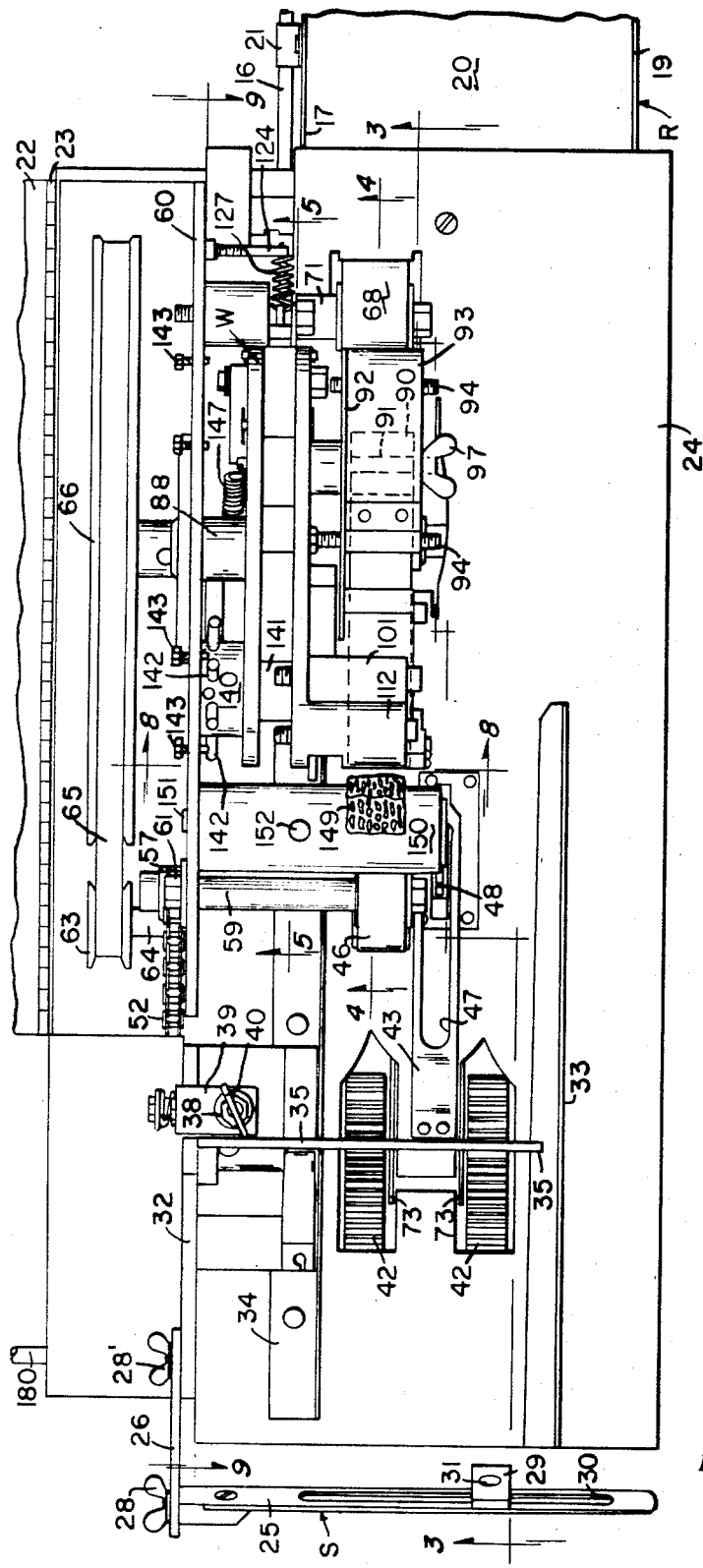
FIG. 2 is an enlarged, fragmentary top plan view of the stamp affixing machine of FIG. 1, with a hinged cover in open position.
Figure 9:
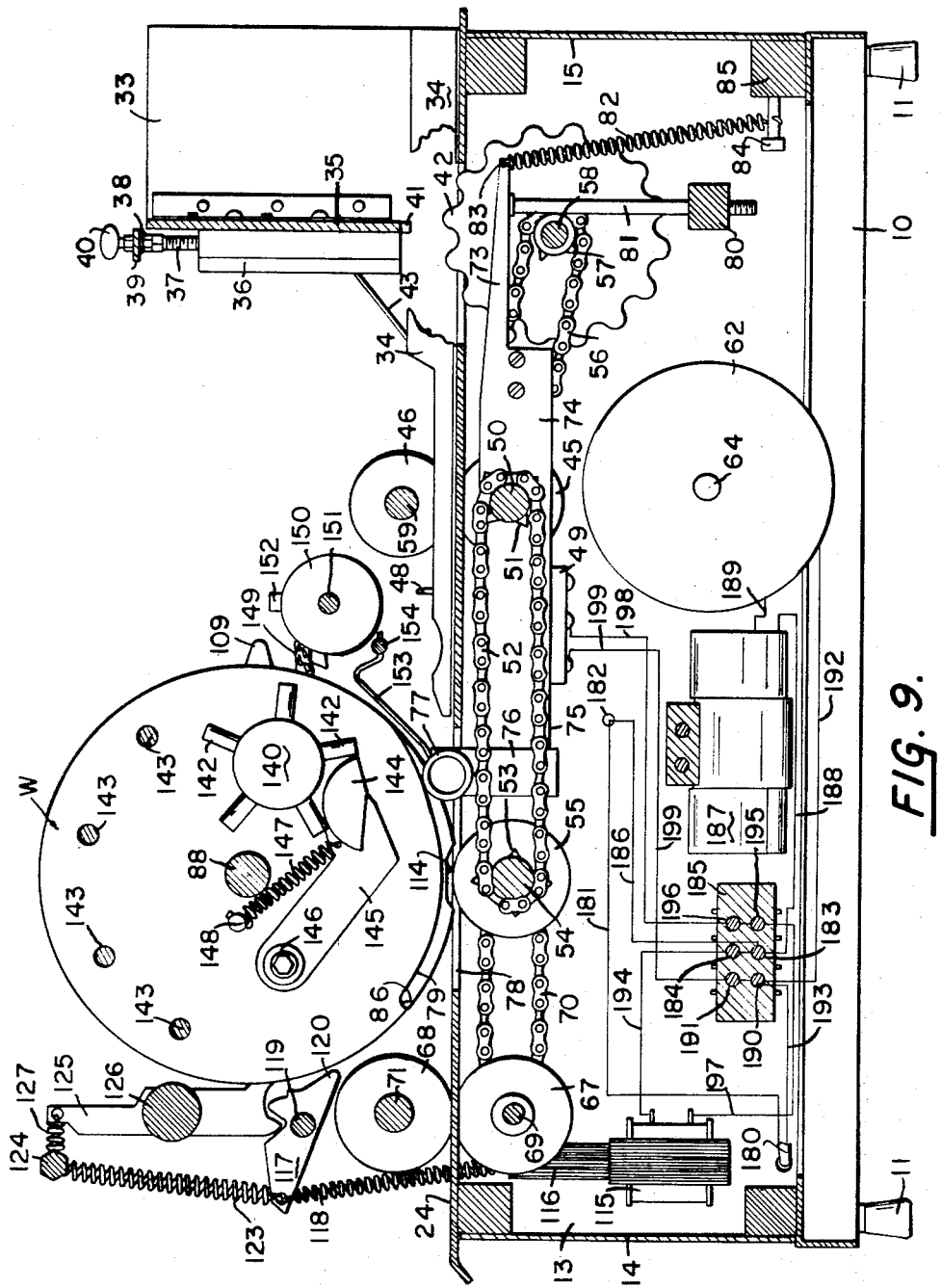
FIG. 9 is a longitudinal section, taken along line 9—9 of FIG. 2, showing an envelope feed mechanism, a stamp indexing mechanism and an electric circuit for the machine.
Figure 13:
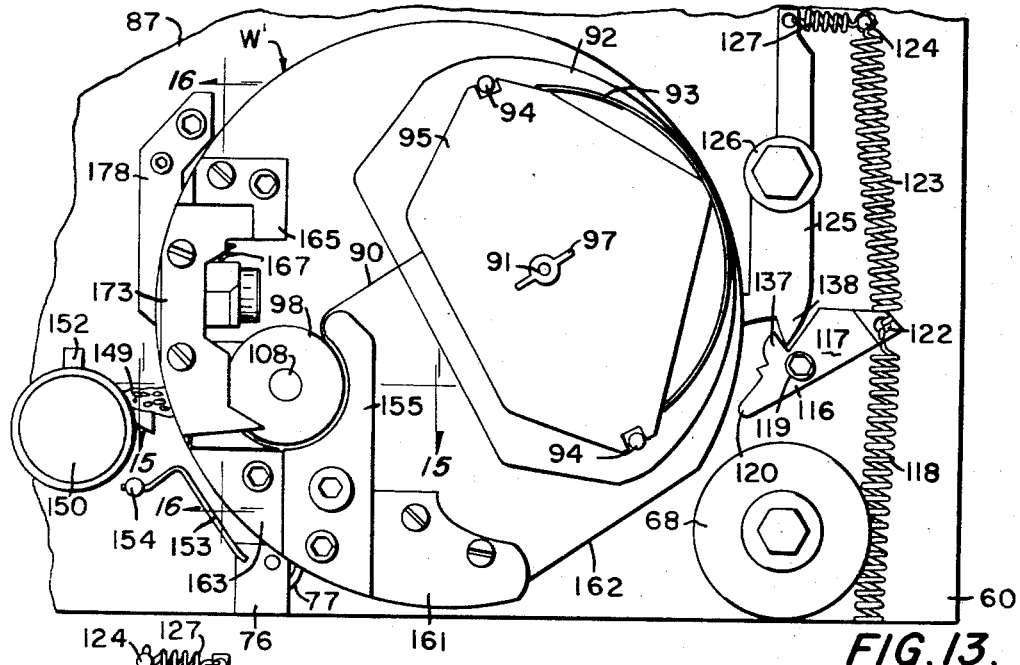
FIG. 13 is a fragmentary, enlarged side elevation of an alternative stamp feed wheel, in a stamp moistening position.
Figure 14:
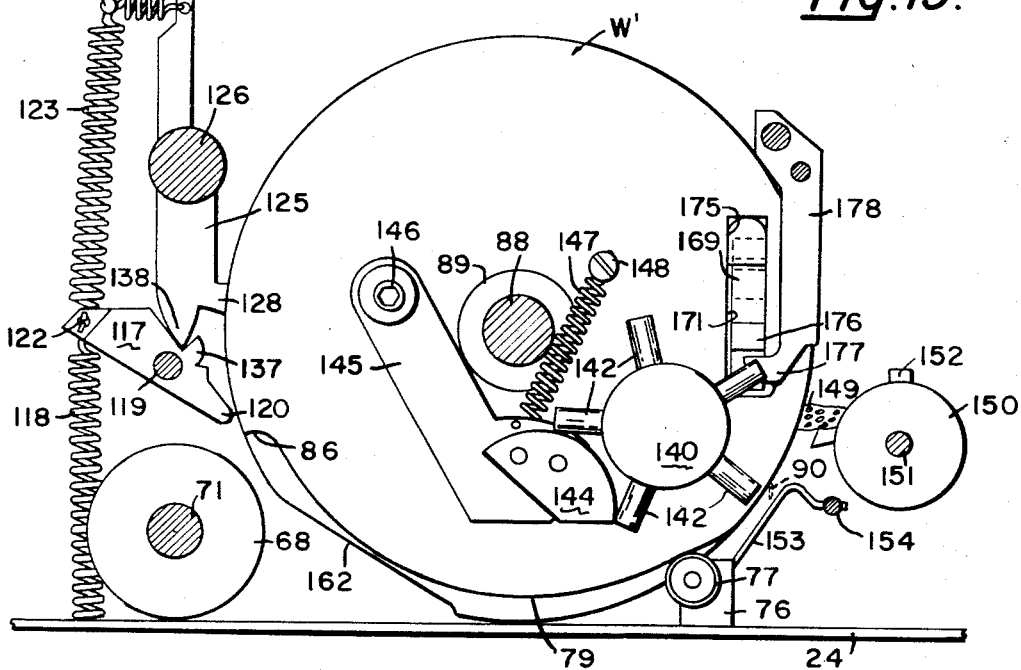
FIG. 14 is a side elevation from the opposite side of the stamp feed wheel of FIG. 13, showing the indexing mechanism and stamp severing mechanism therefor.
Figure 15:
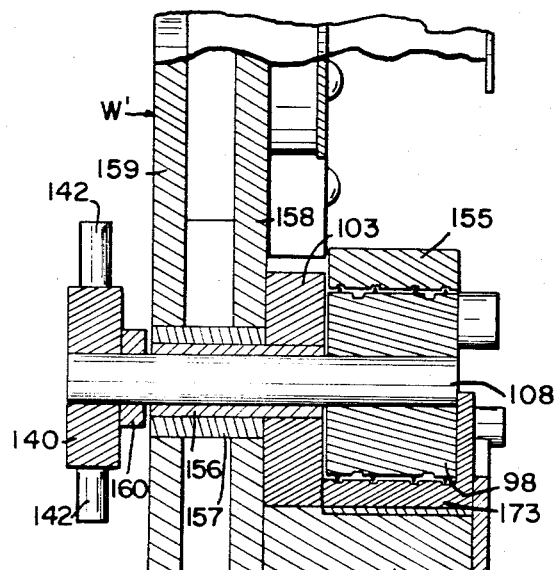
FIG. 15 is a fragmentary horizontal section, taken along line 15—15 of FIG. 13, showing details of an indexing wheel and sprocket.

Drive roller 45 is mounted for rotation on a shaft 50, which is journaled in bearings mounted on front and rear walls 12 and 13, with a sprocket 51 on the outer end thereof, as in FIGS. 2 and 9, for engaging an endless chain 52 which also extends around a sprocket 53 mounted on a shaft 54 for turning a stamp wheel drive roller 55. Advantageously, another chain 56 extends from a sprocket (not shown), adjacent wall 13 but on shaft 50, to a sprocket 57 on a shaft 58 on which cog wheels 42 are mounted, so that they are driven in synchronism with feed wheel 45. Idler roller 46 is journaled on a shaft 59 attached to an upstanding back plate 60 by means of a bolt 61, as in FIG. 2, which extends through plate 60 and is received in internal threads within shaft 59. Conveniently, all of the rollers are driven from a motor 62, connected to a small pulley 63, as in FIG. 2, mounted on the end of motor shaft 64 for driving, through a belt 65, a large pulley 66 mounted on the end of shaft 54 of FIG. 3. After the envelopes have passed stamp wheel W and one or more stamps are applied thereto, they will pass between squeeze rollers 67 and 68 which are positioned to squeeze the applied stamps against the envelope to insure that they will not come off. Roller 67 is mounted for rotation by a shaft 69, as in FIG. 9, which is driven by an endless chain 70 extending from sprockets (not shown) on shaft 69 and shaft 54, while roller 68 is mounted for rotation about a shaft 71 through frictional engagement with roller 67.

As indicated above, the envelopes in stacker S are prevented from moving forwardly, after one envelope has been dispensed, by projection 41. However, to provide a more positive stop, a stop channel 73 is provided, whose flanges are adapted to be raised above cog wheels 42 on the inside of each, as in FIG. 2. As in FIG. 9, channel 73 is formed integrally with a plate 74, which is mounted for pivotal movement about shaft 50. The opposite end 75 of plate 74 is offset laterally and is provided with an upwardly extending leg 76 to which a cam roller 77 is attached. Leg 76 is adapted to extend through a slot 78 in top plate 24, as in FIG. 9, so that roller 76 will be engaged by stamp wheel W and will be forced downwardly thereby as the stamp wheel turns, except when a cam groove 79 in wheel W permits channel 73 to be moved downwardly by a weight 80 adjustably attached to a vertical rod 81 extending downwardly from channel 73 and a spring 82 which is attached at one end to a lip 83 of channel 73 and attached at the other end to a pin 84 extending outwardly from a block 85 attached to base 10. Thus, it is evident that at all times no more than one envelope can be dispensed during a single revolution of the stamp dispensing wheel W. As an envelope passes between rolls 45 and 46 and strikes microswitch lever 48, the operation of stamp wheel W will commence. As the stamp wheel turns, cam roller 77 will be forced downwardly and will ride on the outside of the wheel until it reaches a shoulder 86 and is permitted to move downwardly again by cam groove 79. Thus, once an envelope engages lever 48 to activate the stamp wheel, as described below, another envelope is not dispensed until the stamp wheel completes a revolution.

Figure 4:
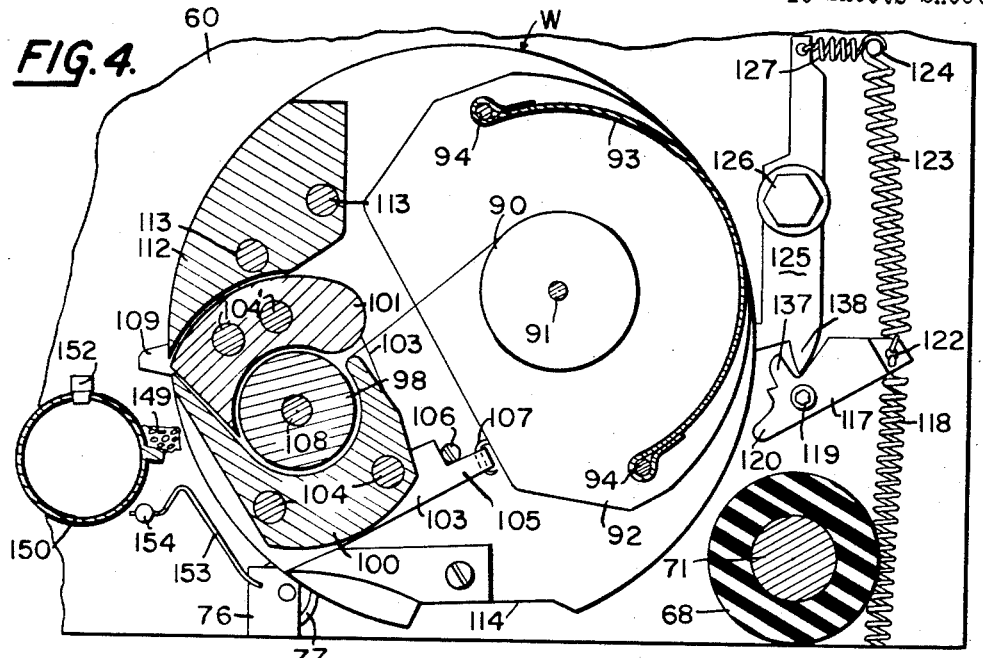
FIG. 4 is a fragmentary, enlarged vertical section, taken along line 4—4 of FIG. 2, showing details of the stamp feed wheel.
Figure 5:
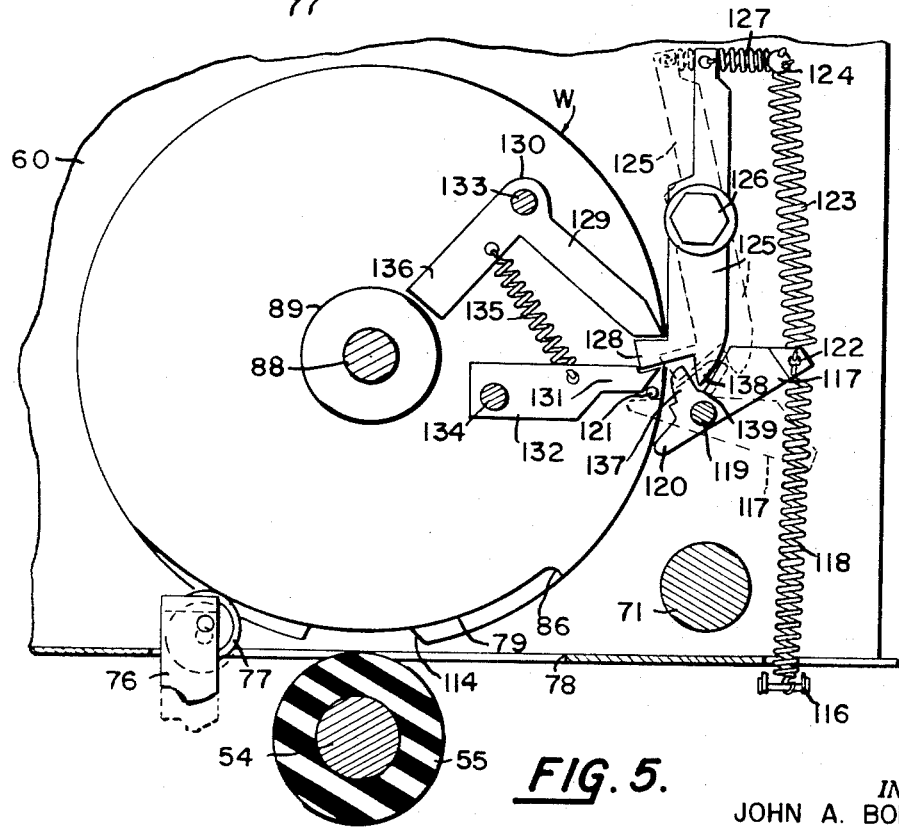
FIG. 5 is a fragmentary, enlarged vertical section, taken along line 5—5 of FIG. 2, showing the clutch mechanism for the feed wheel in neutral position in solid lines and in starting position in dotted lines.
Figure 6:
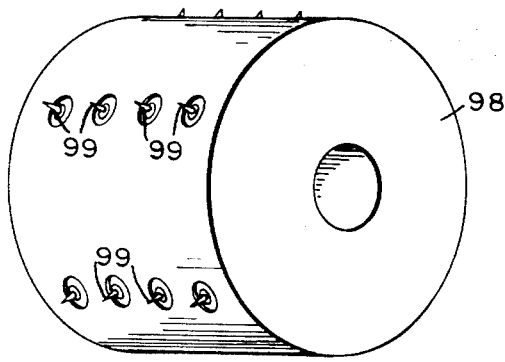
FIG. 6 is an enlarged, perspective view of a feed sprocket for the stamp feed mechanism.
Figure 7:
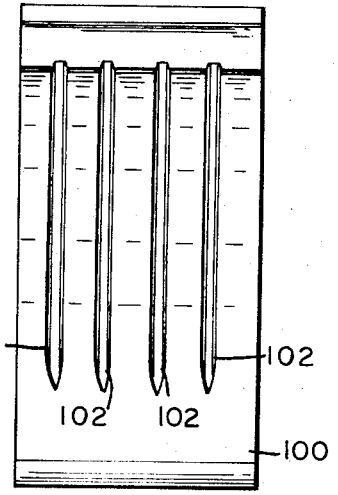
FIG. 7 is a front elevation, looking into the interior of a stamp shoe which cooperates with the sprocket of FIG. 6.

Stamp dispensing wheel W is conveniently rotatably mounted on vertical plate 60 by a shaft 88, as in FIGS. 2, 8, 9 and 10, and may be provided with an axially extending bearing or hub 89, as in FIG. 5, to add to the rigidity of the wheel on the shaft. Conveniently, all of the parts of the stamp dispensing machine may be made from aluminum, magnesium or other alloy. This is particularly true of stamp wheel W, which may be cut away to provide cam groove 79 and other recesses and reliefs at various points around the circumference, as described below. A roll of stamps 90, shown in FIG. 4 and in dotted lines in FIG. 3, is mounted on a spindle 91 extending from a plate 92, which is attached to the face of wheel W. The roll of stamps is contained by a semicircular band 93, extending between two pins 94 spaced on opposite sides of spindle 91, and a cover plate 95, as in FIG. 3. Cover plate 95 has notches 96 which engage pins 94, the cover plate 95 being held in place by a thumb nut 97 which is threadably received on the end of spindle 91. The stamps are fed by a sprocket 98, having circumferentially spaced rows of pins or projections 99, as in FIG. 6, which extend through the perforations between the stamps, through a slot formed between a shoe 100 and a curved plate 101 mounted on the opposite side of sprocket 98. Conveniently, shoe 100, as in FIG. 7, has a plurality of longitudinal slots 102 on its inner surface adapted to accommodate projections 99 as the sprocket 98 is rotated. Shoe 100 is mounted on a pivot plate 103 by bolts 104, while curved plate 101 is attached to pivot plate 103 by bolts 104', as in FIGS. 3 and 4. Pivot plate 103 has an inwardly extending leg 105 which normally engages a stop pin 106 on dispensing wheel W and is held thereagainst by a spring 107 which extends through leg 105, as in FIG. 4, the other end of spring 107 being anchored to dispensing wheel W. Pivot plate 103 and its associated parts are pivotal about a shaft 108 by which sprocket 98 is also turned. Conveniently, pivot plate 103 is provided with an outwardly extending pivot arm 109, as in FIG. 3, adapted to strike top plate 24 as dispensing wheel W rotates, to cause the stamps which have been dispensed outwardly of the end of shoe 100 and applied to an envelope 110, as in FIG. 12, to be severed by the serrated edge 111, as in FIG. 10, of a shear 112, fixedly attached to the dispensing wheel by bolts 113, as in FIGS. 3 and 10.

Figure 3:
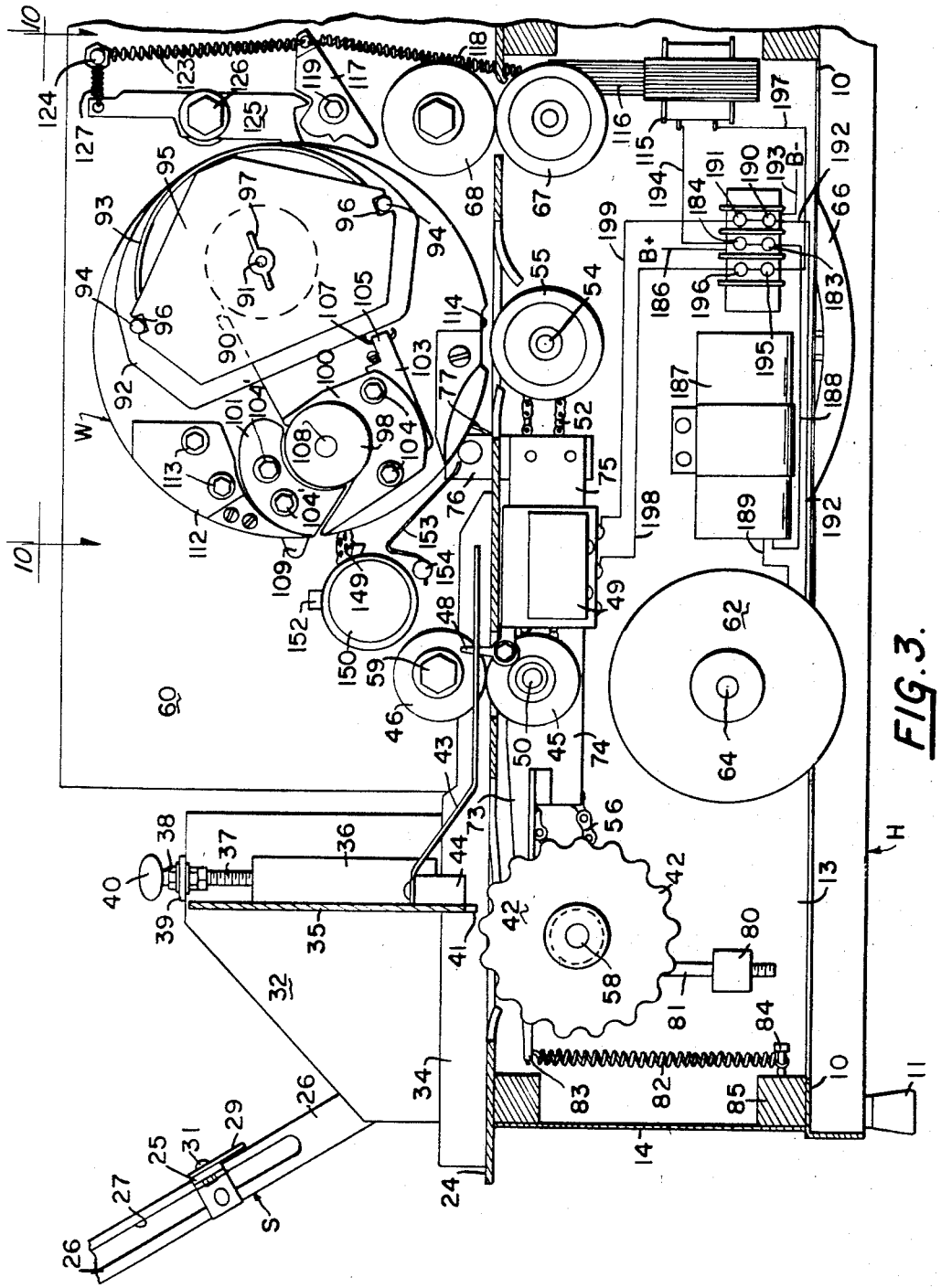
FIG. 3 is a longitudinal offset section, taken along line 3—3 of FIG. 2, showing details of the envelope feed mechanism, stamp feed wheel and electrical system.

Prior to an envelope striking microswitch 48, the position of dispenser wheel W is that shown in FIGS. 1 and 3, wherein a relief 114 is positioned directly above drive roller 56, so that the drive wheel W will remain stationary even though drive roller 56 is being driven. However, when microswitch lever 48 is struck, by an envelope being fed forwardly by cog wheels 42, to close microswitch 49, a solenoid 115 is activated, with core 116 of the solenoid being connected to a started lever 117 by means of a coil spring 118, as in FIG. 3. Starter lever 117 is pivotally mounted on a pin 119 and has a pawl 120 which is adapted to engage a starter pin 121 on dispensing wheel W, as shown in dotted lines in FIG. 5, to cuase it to be turned in a counterclockwise direction, as viewed in FIG. 5, so that the periphery of wheel W beyond relief 114 engages drive roller 55, which turns the dispensing wheel through one complete revolution until relief 114 is again reached. Conveniently, a hole 122 is provided in the outer end of lever 117, to which the upper end of coil spring 118 and the lower end of a coil spring 123 are attached. The upper end of spring 123 is connected to a pin 124 mounted on plate 60 so that the proper tension is maintained on starting lever 117 at all times. When solenoid 115 is activated, lever 117 will be pivoted, as viewed in FIG. 5, in a clockwise direction about pivot pin 119 through spring 118.

As will be noted, dispensing wheel W is normally held in a locked position by a lock lever 125 pivotally mounted intermediate its ends on a pin 126, mounted on wheel W. The upper end of lock lever 125 is resiliently connected to pin 124 by a coil spring 127, as shown, thereby normally urging inwardly a pawl 128, at the lower end of the lever, and normally disposed betwen the end of an arm 129 of an angular lever 130 and an extension 131 of a plate 132, to prevent rotation of dispensing wheel W. Lever 130 is pivoted on a pin 133 extending from the back of dispensing wheel W, while plate 132 is pivoted on a similar pin 134, also extending from the back of dispensing wheel W, and a spring 135 extends between arm 136 of lever 130 and plate 132. Thus, upon actuation of solenoid 115, starter lever 117 will be pivoted in a clockwise direction, as viewed in FIG. 5, so that an upwardly extending lip 137 of starter lever 117 engages a lip 138 at the lower end of lock lever 125, which normally extends into a notch 139 adjacent lip 137, to pivot locking lever 125 in a counterclockwise direction, thereby moving pawl 128, as shown in dotted lines in FIG. 5, out from between leg 129 of lever 130 and extension 131 of plate 132. At the same time, pawl 120 engages pin 121 to turn dispensing wheel W, as described above. Coil spring 135 permits relative movement between arm 129 and extension 132 to allow pawl 128, which has a dove-tail configuration, to move in and out from between arm 128 and extension 132.

Figure 8:
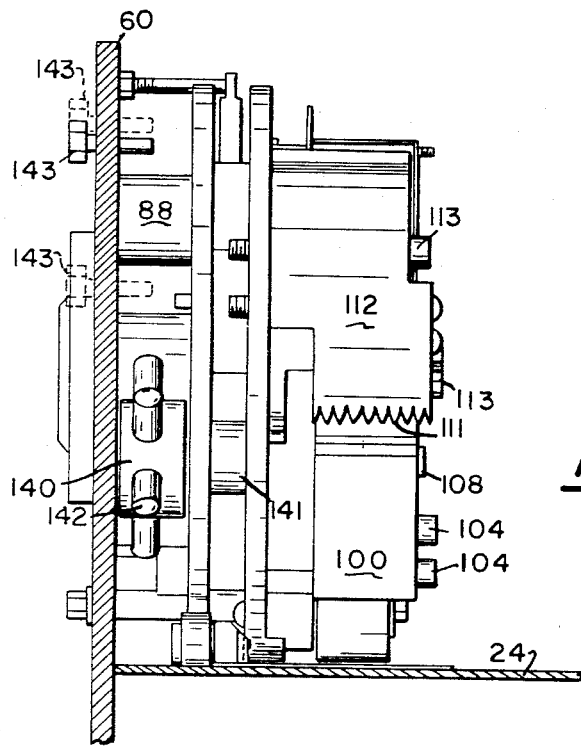
FIG. 8 is a fragmentary, vertical section, taken along line 8—8 of FIG. 2, showing also an indexing wheel.

During rotation of dispensing wheel W, sprocket 98 will be turned in increments by an indexing wheel 140, as in FIGS. 8 and 10, which is attached to the opposite end of shaft 108 which extends through a bushing 141 of FIG. 10 in dispensing wheel W to sprocket 98. Wheel 140 has a series of radially extending arms 142, such as five, which are adapted to engage one or more removable pins 143, as in FIGS. 2, 8 and 10, which extend through holes 143' in plate 60 to rotate the index wheel 140 and sprocket 98 with it to advance the stamps. As best illustrated in FIG. 9, the holes 143' are circumferentially spaced, and each is adapted to receive a pin 143. Thus, when only one stamp is to be placed on each envelope, only one hole is provided with a pin 143, which will be struck by an arm 142 as dispensing wheel W turns through one revolution, causing the indexing wheel 140 and sprocket wheel 98 to be advanced a distance sufficient to extend one stamp beyond shear 111 of FIGS. 3, 4, 8 and 12. However, if two or more stamps are to be dispensed, as indicated in dotted lines in FIG. 10, a second or additional pins 143 are placed in subsequent holes, each of which will also strike one of the index arms 142 to advance sprocket 98 the distance necessary to dispense a second, third or fourth stamp. Thus, with the apparatus shown, the number of stamps applied to one letter may be as many as four. However, it will be readily understood that, by changing the dimensions of the machine and its parts, it may be adapted to dispense a greater number of stamps, if desired.

Indexing wheel 140 is held in indexed position, after being advanced, by means of a generally semicircular cam 144, as in FIG. 11, mounted on the end of a lever 145 whose other end is pivotally attached to dispensing wheel W by a pin 146, as in FIG. 9. Cam 144 is held in engagement with two adjacent index arms 142 by means of a coil spring 147 having one end connected adjacent cam 144 and the other end connected to a pin 148, as in FIG. 9. As the indexing wheel is turned, cam 144 will be forced outwardly by one of the index arms engaging the cam and then will be urged between the index arm and the next adjacent arm by spring 147, to hold the index wheel in indexed position.

The dispensed stamps are moistened by a wick 149 of FIGS. 2, 3 and 9, as the dispensing wheel rotates, just prior to their application to an envelope. Wick 149 extends from a container 150 which is attached to plate 60 by a bolt 151 and may be filled with water through an opening nonrmally closed by a stopper 152. As dispensing wheel W rotates, the stamps will be wiped against wick 149, applying moisture to the backs thereof, but the stamps are prevented from curling by an angular metal rod 153 attached to a pin 154 extending from plate 60, as in FIG. 9. Immediately after being moistened, the stamps are applied directly to the envelope 110 of FIG. 12, which passes between dispensing wheel W and drive roller 55, of FIGS. 3 and 9. As discussed above, as the stamps are applied to the envelope, arm 109 will strike top plate 24 so that plate 103 and its associated parts will be rotated in a clockwise direction, as viewed in FIG. 4, so that the dispensed stamps are severed by shear edge 111. The envelope then passes through squeeze rollers 67 and 68, which assure that the stamps are firmly applied to the envelopes and also discharge the stamped envelopes into receptacle R.

Figure 16:
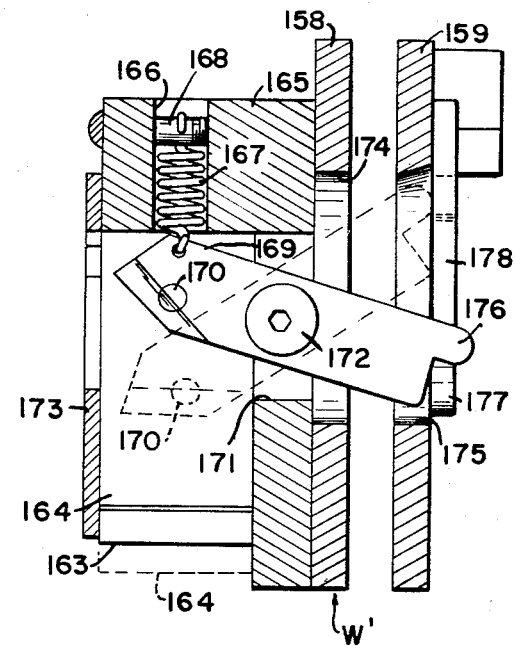
FIG. 16 is a vertical section, taken along line 16—16 of FIG. 13, showing details of the stamp severing mechanism with a cutter blade in retracted position shown in solid lines and in extended position in dotted lines.

An alternative embodiment of the cutter mechanism is shown in FIGS. 13–16, in which like parts are given like reference numerals. In this embodiment, the roll of stamps 90 is fed between a shoe 155 and sprocket 98, mounted for rotation with shaft 108. As in the previous embodiment, sprocket 98 is advanced by indexing wheel 140. Conveniently, as in FIG. 15, shaft 108 extends through a bushing 156, as of brass, which rotates within the outer bushing 157, as of steel, which is fixedly mounted within dispensing wheel W', between front and rear wheels 158 and 159, respectively, while the indexing wheel 140 is spaced from dispensing wheel W' by a disc 160. The operation of the indexing wheel is the same as described above with respect to FIGS. 1–12. In this regard, a driving plate 161 having a friction surface may be attached to wheel W' adjacent a recess 162, so that additional friction surface contacts drive roller 55 after activation of the dispensing wheel to eliminate any possibility of slippage. After the stamps have been indexed, they will extend beyond a shear plate 163 and be moistened by wick 149 as the dispensing wheel W' rotates. A cutter 164, as in FIG. 16, is mounted for vertical movement within a block 165 having a radial bore 166 through which extends a coil spring 167, one end of which is attached to a pin 168 extending transversely through bore 166. Conveniently, shoe 155, shear plate 163 and block 165 may be formed integrally, if desired. The opposite end of spring 167 is connected to a lever 169, above a pivotal connection 170 to cutter 164. Lever 169 extends through a slot 171 in block 165 and is pivoted thereto by a pin 172 extending transversely across the slot. A cover plate 173, which extends over the outer face of block 165 and is held in place by a pair of screws, as shown, serves as a guide for cutter 165 as it reciprocates in a manner to be described. Thus, the end of lever 169 extends through slots 174 and 175 in the front and back walls, respectively, of dispensing wheel W' and has an outwardly extending ear 176 adapted to engage an inwardly extending flange 177 of an arm 178 which is mounted on back plate 60. It can readily be seen that, as dispensing wheel W' rotates, lever arm 169 will be pivoted by engagement with arm 178, so that cutter 164 is moved downwardly past shear plate 163, thereby severing the dispensed stamps from the roll. The stamps are conveniently affixed to the envelope as in the previous embodiment.

The electrical circuit may be quite conventional. Thus, an electrical cord 180 may be provided, as in FIGS. 2 and 9, which extends through side wall 13 and may be connected to any suitable A.C. outlet of 110/120 volts. Cord 180 includes a wire 181 connected to one side of an on-off switch 182, as in FIG. 1, the opposite side of switch 182 being connected to interconnected center terminals 183 and 184 of a terminal block 185 by a wire 186. A capacitor 187, which is connected to terminal 183 by a wire 188, in turn is connected in series with motor 62 by a wire 189, the opposite side of motor 62 being connected to interconnected terminals 190 and 191 of terminal box 185 by a wire 192. The motor circuit is then completed by a wire 193 of cord 180 extending to terminal 190. By utilizing capacitor 187 in the circuit, the starting torque of motor 62 may be boosted. Thus, motor 62 may be very small, such as $\frac{1}{20}$ horsepower, so that it will fit within the confines of housing H. One side of solenoid 115 is connected to terminal 184 by a wire 194, while the other side of the solenoid is connected to interconnected terminals 195 and 196 by a wire 197. One side of microswitch 49 is connected to terminal 196 by a wire 198, while the other side is connected to terminal 191 by a wire 199. Thus, microswitch 49 is connected in series with solenoid 115, so that the solenoid is energized only when the microswitch is closed.

It can be seen that upon closing switch 182, motor 62 will be energized, causing drive rollers 45, 55 and 67 to begin rotating, together with cog wheels 42 which will dispense the first envelope, as described above. As the envelope is fed between rollers 45 and 46, it will strike microswitch lever 48, thereby closing microswitch 49 and energizing solenoid 115. As described above, the energization of solenoid 115 will begin the rotation of dispensing wheel W. The stamps which have been dispensed during the previous rotation of the dispensing wheel will be moistened and applied to the envelope, while the dispensing wheel will continue to be rotated by drive roller 55 which will now engage the outer periphery of the dispensing wheel. During this rotation, the appropriate number of stamps will be dispensed, due to the engagement of indexing wheel 140 with pins 143. When the dispensing wheel again reaches the position where relief 114 is above drive roller 55, it will stop. However, upon the closing of microswitch 49 by engagement of lever 48 by a second envelope, the cycle will be repeated. Of course, the envelope which has been stamped will be fed through affixing squeeze rollers 67 and 68 into receptacle R. When the last envelope has been stamped, microswitch 49 will remain open and all operations of the dispensing wheel W will stop. The motor 62, together with drive rollers 45, 55, 67 and cog wheels 42, will continue running until switch 182 is turned off.

From the foregoing, it is readily apparent that a stamp dispensing machine constructed in accordance with this invention fulfills to a marked degree the requirements and objects hereinbefore set forth. A stamp machine has been provided in which postage stamps are individually placed onto an envelope or in which a plurality of stamps may be placed on an envelope at one time. In addition, the roll of stamps may be placed in the machine without the necessity of rewinding, thereby eliminating a costly and time consuming job. The envelopes are dispensed one at a time from a hopper or stacker and the stamps are applied to the envelopes so that the stamp is in the upper right hand corner of the envelope and is right side up. Furthermore, it will be evident that the stamps are fed in a direction opposite to the direction in which the envelopes move, but because of the rotary motion of the stamp dispensing wheel W, the stamps are applied to the envelopes without any interruption in the continuous feeding of the envelopes. A member is provided adjacent the lower periphery of the stamp dispensing wheel which prevents the stamps from curling after they have been moistened by a wick located just above. Furthermore, because of the stop channel which engages the stacked envelopes after an envelope has been dispensed, no more than one envelope may be dispensed at the same time. In addition, means are provided for cupping the lowermost envelope, so that it will be separated from the other envelopes and be dispensed while the others remain in the stacker. After the supply of envelopes has been exhausted, the operation of the dispensing wheel will stop before additional stamps are moistened. An indexing means is provided which comprises an indexing wheel mounted on the dispensing wheel which has radially extending arms that are adapted to strike removable pins mounted on a stationary plate and corresponding in number to the number of stamps to be dispensed, so that the correct number of stamps are applied to each envelope. To change the number of stamps being dispensed, it is only necessary to remove or add pins. Finally, the dispensed stamps are severed from the roll by a shear plate or cutter which is activated by a lever which either strikes the top plate of the housing or an arm attached to the back plate. It should be readily apparent that the machine can be adapted for placing address labels on envelopes by changing the location of the dispensing wheel so the label is applied intermediate the upper and lower edges of the envelope and relocating the microswitch so that the label is placed intermediate the ends of the envelope. Obviously, the machine could also be adapted for applying tape to packages for sealing them.

Although a preferred embodiment of this invention and an alternative cutter have been illustrated and described, it will be understood that various changes and variations may be made without departing from the spirit and scope of this invention.

What is claimed is:

1. A stamp dispensing and affixing machine, including:
   a rotatable stamp dispensing and affixing wheel;
   means for feeding envelopes past said wheel;
   a spindle mounted on said wheel and adapted to receive a roll of stamps;
   a feed sprocket mounted on said wheel adjacent said spindle and around which said stamps are fed;
   indexing means operatively connected to said feed sprocket for selectively rotating said feed sprocket and thereby dispensing said stamps;
   resilient holding means engaging said indexing means for holding said indexing means in indexed position; and
   shear means adjacent said feed sprocket adapted to sever said stamps after they are dispensed.

2. A stamp dispensing and affixing machine, as set forth in claim 1, wherein said indexing means has a plurality of radially extending arms and including:
   means mounted adjacent said wheel for rotating said indexing means as said wheel is rotated to feed said stamps.

3. A stamp dispensing and affixing machine, as set forth in claim 2, wherein said rotating means includes a plate disposed adjacent said wheel and provided with removable projections, each adapted to engage an arm of said indexing means during a revolution of said stamp wheel to advance said feed sprocket and dispense stamps corresponding in number to the number of projections extending from said plate.

4. A stamp dispensing and affixing machine, as set forth in claim 2, wherein said holding means includes:
   an arm having one end pivoted to said stamp wheel;
   a cam attached to the other end of said arm and adapted to be received in the space between two radial arms of said indexing means; and
   a spring having one end attached to said stamp wheel and the other end attached to said arm intermediate its ends and normally urging said cam between adjacent radial arms of said indexing means.

5. A stamp dispensing and affixing machine, as set forth in claim 1, which further includes moistening means mounted adjacent said stamp wheel and adapted to moisten said dispensed stamps before said stamps are applied to said envelope.

6. A stamp dispensing and affixing machine, as set forth in claim 1, including normally disengaged drive means for said wheel, a backing plate adjacent said stamp wheel and and starter means for said wheel comprising:
   a lock lever pivoted on said backing plate;
   lock means on said dispensing wheel for receiving one end of said starting lever;
   first resilient means urging said lock lever into said lock means;
   a starter lever pivoted to said backing plate below said locking lever and engageable therewith;
   a solenoid; and
   second resilient means extending between said solenoid and said starter lever adapted to pivot said starter lever out of engagement with said lock means and to turn said stamp wheel so that it is brought into engagement with said drive ments.

7. A stamp dispensing and affixing machine, as set forth in claim 6, wherein said drive means includes:
   a drive roller adjacent said stamp wheel; and
   said stamp wheel is provided with a groove in its periphery into which said drive roller extends, but upon rotation of said stamp wheel by said starter lever, said stamp wheel is brought into driving engagement with said drive wheel.

8. A stamp dispensing and affixing means, as set forth in claim 1, including:
   a flat plate pivotally mounted on said stamp wheel on the same axis as said sprocket;
   a shoe mounted on said flat plate and extending around a portion of said sprocket;
   a curved plate mounted on said flat plate and extending around the remainder of said sprocket, a slot being formed between said curved plate and said shoe adjacent said shear means through which said stamps extend after passing around said sprocket; and
   an arm extending from said flat plate beyond the edge of said stamp wheel and adapted to engage the top of said housing as said stamp wheel rotates, thereby rotating said flat plate, shoe and curved plate, so that said slot moves past said shear means to sever the dispensed stamps from the roll.

9. A stamp dispensing and affixing machine, as set forth in claim 1, including:
   a backing plate extending from the top of said housing adjacent said stamp wheel;
   a reciprocating cutter attached to said stamp wheel;
   resilient means normally holding said cutter in a stationary position;
   a stationary shear plate spaced from the end of said cutter, the stamps being adapted to be dispensed therebetween;
   a lever arm pivoted intermediate its ends to said stamp wheel and having one end connected to said cutter and the other end extending through said wheel to a point adjacent said backing plate; and
   an arm mounted on said backing plate adapted to engage said lever during rotation of said wheel to move the end of said cutter past said shear plate, thereby severing said dispensed stamps.

10. A stamp dispensing and affixing machine, as set forth in claim 9, including an ear extending from said lever arm; and
   a lip on said backing plate arm adapted to engage said ear to cause reciprocal movement of said cutter bar during a revolution of said stamp wheel.

11. A machine for dispensing and affixing stamps and the like, comprising:
   a movable wheel;
   means for feeding envelopes and the like past said wheel;
   means mounted on said wheel for receiving a roll of stamps and the like having an adhesive on the under surface when in roll form;
   means engaging the surface opposite said adhesive surface for feeding successive predetermined portions of said roll to and past the periphery of said wheel;
   means for guiding each such portion to an extended position adjacent the periphery of said wheel opposite the normal direction of movement of said wheel and with the adhesive surface on the outside;
   means for moving said wheel;
   means for applying moisture to such extended portion as said wheel moves normally to apply such extended portion to an envelope and the like; and
means for severing such extended portion from the remainder of such roll.

12. A machine as defined in claim 11, wherein:
said guiding means includes means providing a slot extending to the periphery of said wheel and rearwardly with respect to the direction of movement of the periphery of said wheel.

13. A machine as defined in claim 12, wherein:
said feeding means includes a rotatable member engaging said surface opposite said adhesive surface and disposed in tangential relation to said slot.

References Cited
UNITED STATES PATENTS

| | | | |
|---|---|---|---|
| 1,482,731 | 2/1924 | Burr | 156—442 |
| 1,838,841 | 12/1931 | Keiser | 156—522 |

EARL M. BERGERT, *Primary Examiner.*

DOUGLAS J. DRUMMOND, *Examiner.*